(12) United States Patent
Wang

(10) Patent No.: US 8,965,993 B2
(45) Date of Patent: *Feb. 24, 2015

(54) ENTRUSTED MANAGEMENT METHOD FOR A PLURALITY OF RACK SYSTEMS

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 343 days.

This patent is subject to a terminal disclaimer.

(21) Appl. No.: 13/396,118

(22) Filed: Feb. 14, 2012

(65) Prior Publication Data
US 2013/0138788 A1 May 30, 2013

(30) Foreign Application Priority Data
Nov. 28, 2011 (CN) .......................... 2011 1 0385613

(51) Int. Cl.
G06F 15/173 (2006.01)
(52) U.S. Cl.
USPC ............................ 709/207; 709/220; 709/224
(58) Field of Classification Search
CPC .............. H04L 29/08072; H04L 29/06; H04L 29/08576; H04L 29/08144; E02F 9/2025
USPC ................... 709/220, 232, 248, 207; 340/506
See application file for complete search history.

(56) References Cited

U.S. PATENT DOCUMENTS

| | | | | |
|---|---|---|---|---|
| 7,138,733 | B2 * | 11/2006 | Sanders et al. ................. | 307/147 |
| 7,149,796 | B2 * | 12/2006 | McDaniel-Sanders et al. .............................. | 709/223 |
| 8,028,202 | B2 * | 9/2011 | Takagi et al. ................. | 714/47.2 |
| 8,275,847 | B2 * | 9/2012 | Lewis ........................... | 709/207 |
| 2005/0179537 | A1 * | 8/2005 | Lewis ........................... | 340/506 |
| 2012/0116590 | A1 * | 5/2012 | Florez-Larrahondo et al. .............................. | 700/275 |
| 2013/0138805 | A1 * | 5/2013 | Wang ............................ | 709/224 |

* cited by examiner

Primary Examiner — Khanh Dinh
(74) Attorney, Agent, or Firm — CKC & Partners Co., Ltd.

(57) ABSTRACT

An entrusted management method for a plurality of rack systems is provided, which includes the following steps. The rack systems are provided, in which each rack system respectively includes an integrated management module (IMM) and a plurality of internal rack devices. The rack systems are distributed into at least one rack group, and one of a plurality of IMMs in each rack group is selected to serve as a primary IMM. The primary IMM is connected to other IMMs through a network, and performs a synchronous configuration procedure to back up a plurality of pieces of configuration information of the other IMMs in the rack group. When an anomaly occurs in a specific IMM or the specific IMM submits an entrustment request, the primary IMM manages, through the network, internal rack devices originally managed by the specific IMM.

14 Claims, 3 Drawing Sheets

ENTRUSTED MANAGEMENT METHOD FOR A PLURALITY OF RACK SYSTEMS

CROSS-REFERENCE TO RELATED APPLICATION

This application claims the priority benefit of China application serial no. 201110385613.8, filed Nov. 28, 2011. The entirety of the above-mentioned patent application is hereby incorporated by reference herein and made a part of this specification.

BACKGROUND OF THE INVENTION

1. Field of the Invention

The present invention generally relates to a technology for centralized management of servers, in particular, to an entrusted management method for a plurality of rack systems.

2. Description of Related Art

Many enterprises provide many servers according to cloud services provided by the enterprises or service requirements, and integrate the servers into rack systems that can be managed in a centralized way, so as to reduce the management cost of the servers.

FIG. 1 is a schematic block diagram of a rack system 100. A network switch 120 and a plurality of servers 110_1-110_n are placed in the rack system 100, where n is a positive integer. The servers 110_1-110_n each have a network port, and the network ports are all connected to the network switch 120.

The servers 110_1-110_n are connected to an Internet 10 through the network switch 120, and the Internet 10 may also be referred to as a serving network. Each server is an independent computer system. For example, the servers 110_1-110_n each include a power supply, a baseboard management controller (BMC), and a plurality of fans for heat dissipation. In the conventional rack system 100, each of the servers 110_1-110_n manages its own power supply and fans through the BMC, so as to manage and control the internal power consumption and temperature thereof.

Since relevant devices in the entire rack system 100 need to be managed, the rack system 100 is further provided with a management module. An integrated management module (IMM) is very important to the rack system, so backup measures are needed if a failure occurs in the IMM.

SUMMARY OF THE INVENTION

Accordingly, the present invention is directed to an entrusted management method for rack systems, in which a leader (primary IMM) is selected from a plurality of rack systems in each rack group to perform synchronous backup and entrusted management on all IMMs in the rack group through a network, so as to achieve high reliability and facilitate centralized management of servers without increasing additional hardware cost.

The present invention provides an entrusted management method for a plurality of rack systems, which includes the following steps. The rack systems are provided, in which each rack system respectively includes an IMM and a plurality of internal rack devices, and the IMMs respectively manage the internal rack devices through a network. The rack systems are distributed into at least one rack group, and one of a plurality of IMMs in each rack group is selected to serve as a primary IMM. The primary IMM is connected to other IMMs through the network, and performs a synchronous configuration procedure to back up a plurality of pieces of configuration information of the other IMMs in the rack group. When an anomaly occurs in a specific IMM or the specific IMM submits an entrustment request, the primary IMM manages, through the network, internal rack devices originally managed by the specific IMM.

In an embodiment of the present invention, the entrusted management method further includes the following steps. Another of the plurality of IMMs in the rack group is selected to serve as a secondary IMM. The secondary IMM performs the synchronous configuration procedure to back up configuration information of other IMMs in the rack group. When the anomaly occurs in the specific IMM or the specific IMM submits the entrustment request, the secondary IMM judges whether the specific IMM is the primary IMM. When the specific IMM is the primary IMM, the secondary IMM is converted into the primary IMM, and one of the other IMMs operating normally in the rack group is selected to become the new secondary IMM.

In an embodiment of the present invention, the primary IMM performs a server management procedure, a heat dissipation management procedure, or a power management procedure to manage the primary internal rack devices and/or the entrusted specific internal rack devices.

Based on the above, a leader (primary IMM) and a deputy leader (secondary IMM) are selected from a plurality of rack systems in each rack group, the leader and the deputy leader perform synchronous backup on all IMMs in the rack group through a network, and when an anomaly occurs in a certain IMM or the IMM submits an entrustment request, the leader can use the backed up data to manage and control in time internal rack devices to be entrusted, and the deputy leader serves as a redundant device of the leader. Therefore, the management and control method provided in this embodiment has high reliability and enables entrusted management of the abnormal IMM, thereby facilitating centralized management of servers without increasing additional hardware cost.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
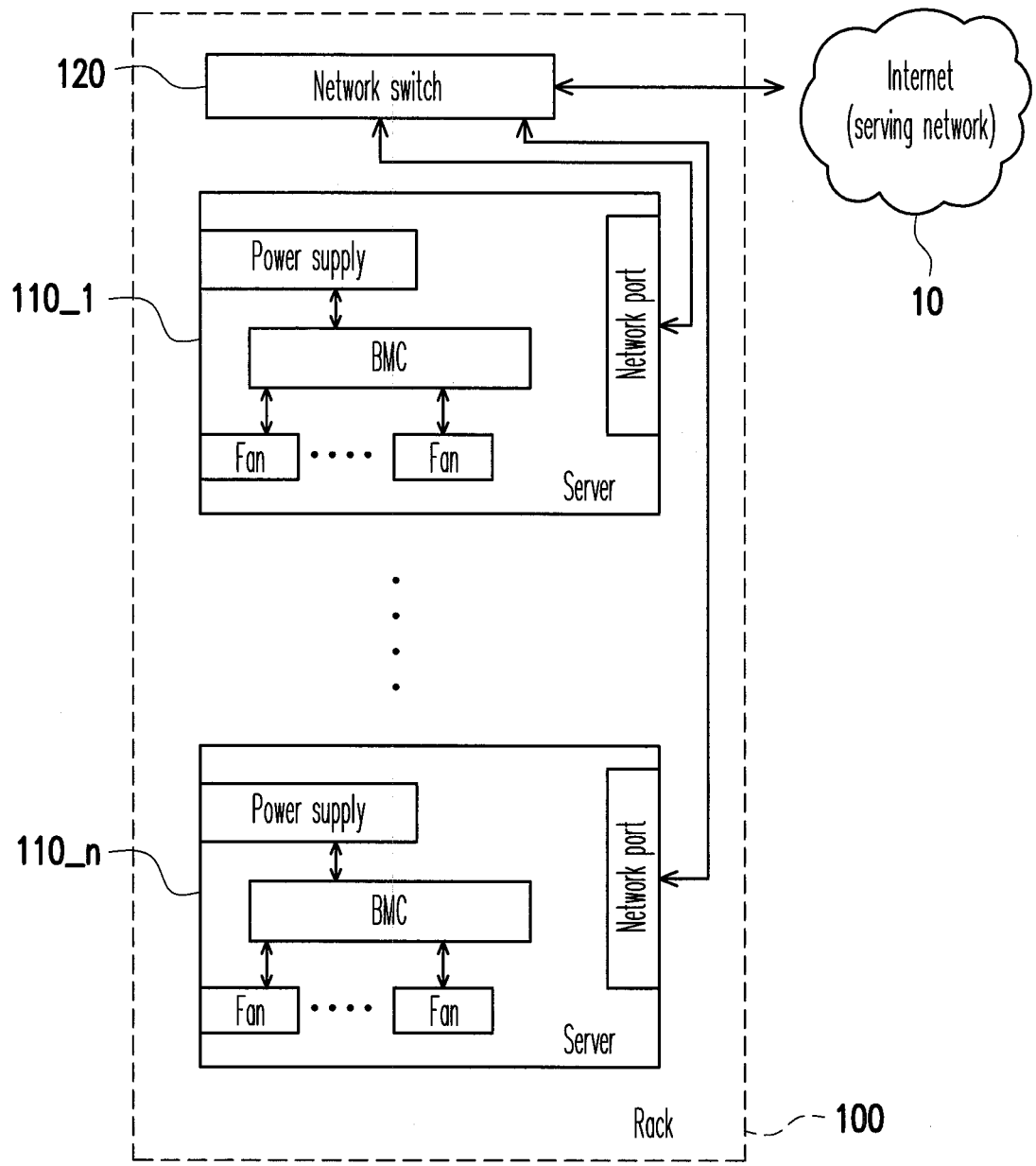
FIG. 1 is a schematic block diagram of a rack system.

Reference will now be made in detail to the present embodiments of the invention, examples of which are illustrated in the accompanying drawings. Wherever possible, the same reference numbers are used in the drawings and the description to refer to the same or like parts.

Conventionally, each rack system only has a single IMM, or can only be provided with a plurality of IMMs to back up and entrust each other, so as to avoid that the rack system fails to operate due to failure or damage of an IMM.

Accordingly, in an embodiment of the present invention, a plurality of rack systems are grouped, and an IMM is selected from one group to serve as a leader (primary IMM), so that the IMMs of the rack systems in the same group are backed up to the leader synchronously through a network. When an anomaly or failure occurs in a certain IMM or the IMM sends an entrustment request, the primary IMM can take initiative to undertake the corresponding rack system and the management work thereof through the backed up configuration data, so as to maintain normal operation of the rack systems and servers in the group.

In addition, in this embodiment, another IMM may also be selected from each group to serve as a deputy leader (secondary IMM) of this group, so that when an anomaly occurs in the leader or the leader sends an entrustment request, the deputy leader additionally selects an IMM operating normally to take over the monitoring work of the abnormal leader or deputy leader.

Figure 2:
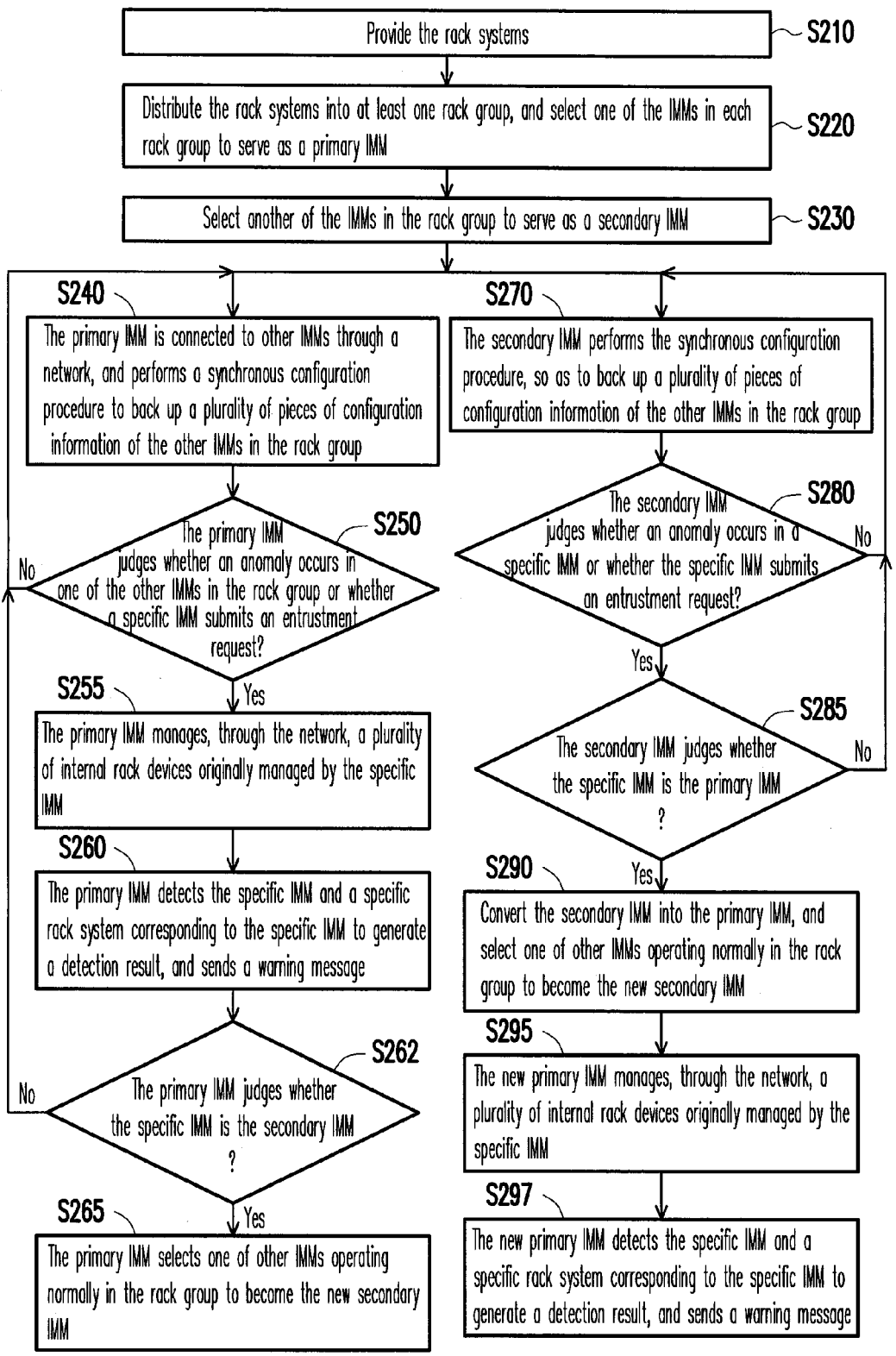
FIG. 2 is a flow chart of an entrusted management method for a plurality of rack systems according to an embodiment of the present invention.

FIG. 2 is a flow chart of an entrusted management method for a plurality of rack systems 300_1-300_M according to an embodiment of the present invention, where M is a positive integer. The monitoring method described in FIG. 2 is applicable to the plurality of rack systems 300_1-300_M. For ease of description, in this embodiment, the rack systems 300_1-300_M may be respectively referred to as Rack 1 to Rack M below, and the hardware structure of the rack systems 300_1-300_M is described in detail in the relevant description of FIG. 3. Moreover, M conforming to the embodiment of the present invention may be 2 or a positive integer greater than 2, which is an example only, and is not intended to limit the present invention.

First, in Step S210, the plurality of rack systems 300_1-300_M is provided in this embodiment. In this embodiment, the rack systems 300_1-300_M are erected in a container to provide Rack 1 to Rack M. Each of the rack systems 300_1-300_M respectively includes an IMM 350_1-350_M and a plurality of internal rack devices. The IMMs 350_1-350_M all manage the internal rack devices in the corresponding rack systems 300_1-300_M respectively through a network. In this embodiment, the internal rack devices may be a plurality of fan units, a plurality of power supplies, BMCs of servers, and/or a combination thereof installed in the rack systems or chassis.

In Step S220, the rack systems 300_1-300_M are distributed into at least one rack group, and one of the IMMs in each rack group is selected to serve as a primary IMM. The IMMs 350_1-350_M of the rack systems 300_1-300_M are connected to each other through a management network. In other words, in Step S220, one of the IMMs in each rack group is selected to serve as a leader (or referred to as the primary IMM). In addition, in Step S230, in this embodiment, another of the IMMs in each rack group is further selected to serve as a secondary IMM. In other words, another IMM than the primary IMM in each rack group is selected to serve as a deputy leader (or referred to as the secondary IMM).

Figure 3:
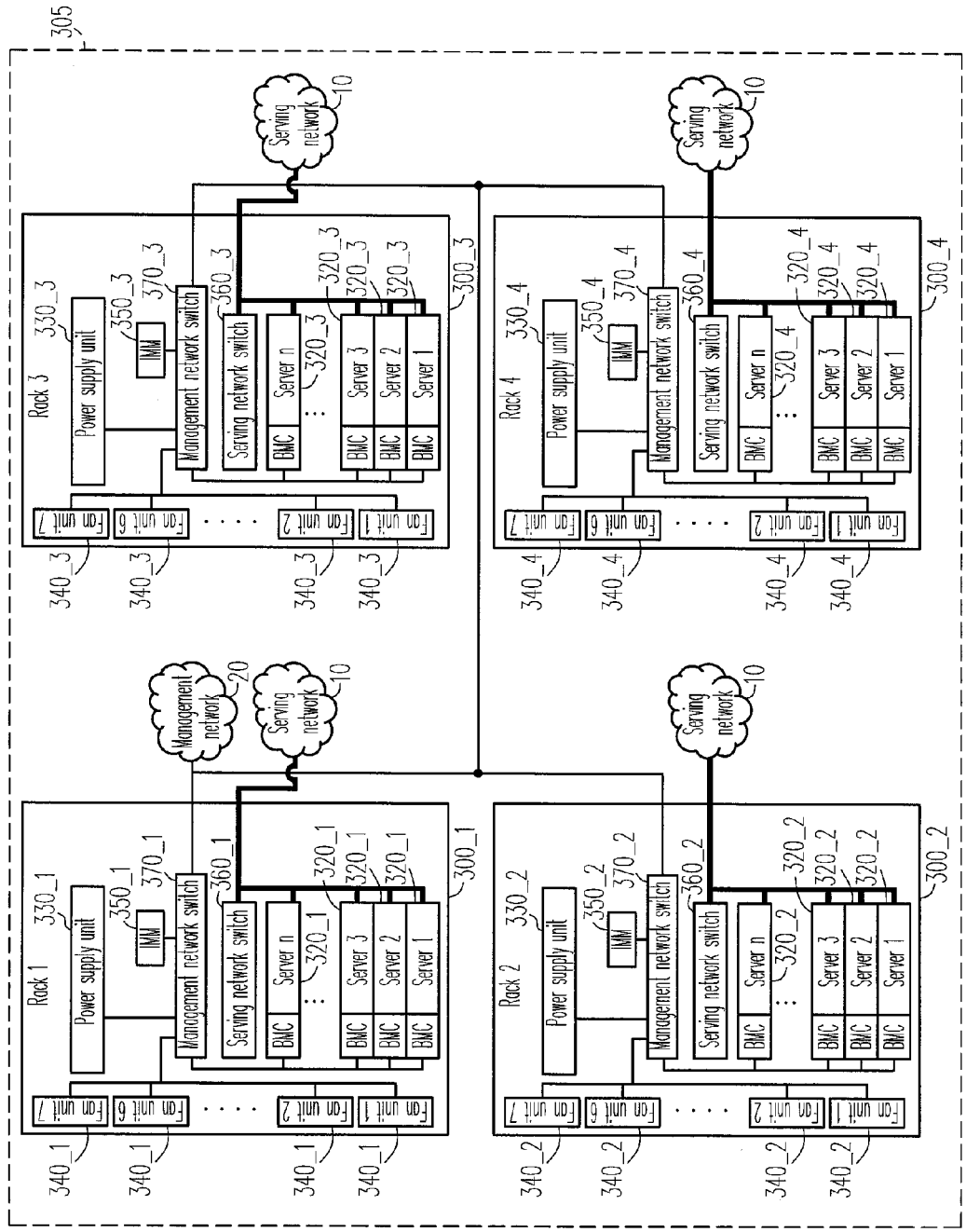
FIG. 3 is a schematic diagram of functional modules of a rack group and rack systems according to an embodiment of the present invention.

In this embodiment, 4 rack systems form a rack group, and a rack group 305 in FIG. 3 is taken as an example. FIG. 3 is a schematic diagram of functional modules of the rack group 305 and rack systems 300_1-300_4 according to an embodiment of the present invention. However, in other embodiments conforming to the spirit of the present invention, two or more rack systems 300_1-300_M may also be distributed to serve as one rack group. Therefore, the number of the rack systems in each rack group is not limited to this, and the number of the rack systems in each group may also vary.

It should be particularly noted that, in Step S220, the distributed structure of the IMMs in the rack systems 300_1-300_M can be used for automatic matching and grouping, so that rack systems corresponding to IMMs in the same network segment are classified into the same group, and the above leader and deputy leader are elected automatically according to relevant feature values of the IMMs. In other words, in this embodiment, rack systems 300_1-300_4 can be automatically distributed into the same rack group 305 through communication between the IMMs.

For example, the IMM of each of the rack systems 300_1-300_M may create a rack information sheet by itself, and write a relevant feature value of the IMM in the rack information sheet. The feature value is, for example, a name (for example, a name preset in a domain name system (DNS)), a serial number, a network protocol address, and/or a media access control (MAC) address of each of the IMMs or other relevant parameters or information capable of identifying the IMM. In addition, each IMM may also transfer its own feature value to neighboring IMMs using a network packet through a management network 20, so as to improve the rack information sheets of other IMMs.

Then, the IMMs can perform their own grouping judgment procedures to match corresponding rack systems 300_1-300_M automatically according to the feature values of the IMMs, so that a fixed number of rack systems can be distributed into the same rack group, and the feature values can be used to select the desirable leader and deputy leader automatically. In this embodiment, rack systems corresponding to IMMs in the same network segment are classified into the same rack group.

In other embodiments, the IMMs 350_1-350_4 may also be connected to a remote integrated management center through the management network 20 and a public network switch, and the remote integrated management center can group the rack systems 350_1-350_4 in a unified way, the details of which will not be described herein again.

The hardware architecture and function of each of the rack systems 300_1-300_M are described in detail herein. As shown in FIG. 3, the rack systems 300_1-300_4 respectively include IMMs 350_1-350_4, a plurality of servers 320_1-320_4, power supply units 330_1-330_4, fan units 340_1-340_4, serving network switches 360_1-360_4, and management network switches 370_1-370_4. Since the rack systems 300_1-300_M are similar to each other, the rack system 300_1 (Rack 1) is taken as an example herein, and Rack 2 to Rack M all can be derived from the description of Rack 1 and will not be described herein again.

The servers 320_1 each have a serving network port. A plurality of network connection ports of the serving network switch 360_1 is respectively connected to the serving network ports of the servers 320_1. As a result, the servers 320_1 can provide services to a serving network 10 (for example, the Internet) through the serving network switch 360_1. In addition, the serving network switches 360_1-360_4 also located in the rack group 305 are connected to the serving networks 10 using respective network connection ports.

The servers 320_1 each have a BMC, and the BMCs each have a management network port. The management network ports of the BMCs are each connected to one of a plurality of network connection ports of the management network switch 370_1. The management network switch 370_1 is coupled to the management network 20. In addition, the management network switches 370_1-370_4 also located in the rack group 305 may be connected to each other or coupled to the public network switch using respective network connection ports so as to form the management network 20. The management network 20 may be a local area network (LAN), for example, an Ethernet. Therefore, the management network switches 370_1-370_4 may be Ethernet switches or other LAN switches.

A management network port of the IMM 350_1 is connected to the management network switch 370_1. In Rack 1, the IMM 350_1 communicates with the BMCs of the servers 320_1 through the management network switch 370_1, so as to obtain operation states of the servers 320_1 (for example, the operation state such as an internal temperature of the servers, and/or control operations of the servers 320_1 (for example, control operations such as start-up, shut-down, and firmware update of the servers).

The rack system 300_1 is also provided with a power supply unit 330_1 and a plurality of fan units 340_1. The power supply unit 330_1 provides electric energy to apparatuses in Rack 1. For example, the power supply unit 330_1 supplies power to the management network switch 370_1, the serving network switch 360_1, the servers 320_1, the fan units 340_1, and the IMM 350_1 in Rack 1. The power supply unit 330_1 and the fan units 340_1 all have a management network port, and the management network ports are connected to the management network switch 370_1. Thereby, the IMM 350_1 can communicate with the power supply unit 330_1 and the fan units 340_1 through the management network switch 370_1, so as to obtain operation states of the power supply unit 330_1 and the fan units 340_1 and/or control operations of the power supply unit 330_1 and the fan units 340_1.

It should be particularly noted that, the internal rack devices of Rack 1 mentioned above in this embodiment are the plurality of fan units 340_1, the power supply unit 330_1, and the BMCs of the servers 320_1 of Rack 1 in FIG. 3. The IMM 350_1 and the internal rack devices in Rack 1 are all connected to a switch (for example, the management network switch 370_1). Moreover, the management network switches 370_1-370_4 in the rack group 305 are connected to each other to implement communication between the IMMs 350_1-350_4.

Thereby, communication commands between the IMMs, authentication messages of the network switches, intelligent platform management interface (IPMI) messages between the BMCs, messages transmitted to the fan units or the power supply units, configuration information and synchronization information between the IMMs, and so on can be transferred on the management network 20. Therefore, all the information transferred on the management network 20 is used for managing the rack systems 300_1-300_M and the internal rack devices thereof.

Referring back to FIG. 2, the entrusted management method for a plurality of rack systems disclosed in this embodiment is further described with reference to FIG. 3. For ease of description, it is assumed herein that the primary IMM selected in Step S220 is the IMM 350_1 in Rack 1, and the secondary IMM selected in Step S230 is the IMM 350_3 in Rack 3. Steps S240-S265 are relevant steps performed by the primary IMM 350_1 on the rack systems 300_2-300_4 in the rack group 305, and Steps S270-S297 are relevant steps performed by the secondary IMM 350_3 on the rack systems 300_1, 300_3, and 300_4 in the rack group 305, which are described below respectively.

Steps S240-S265 performed by the primary IMM 350_1 are described first. In Step S240, the primary IMM 350_1 is connected to other IMMs 350_2-350_4 in the same rack group 305 through a network, and performs a synchronous configuration procedure to back up a plurality of pieces of configuration information of the other IMMs 350_2-350_4 in the rack group 305.

In particular, when performing the synchronous configuration procedure, the IMMs 350_2-350_4 respectively back up configuration information for managing the rack systems 300_2-300_4 to the primary IMM 350_1 in Rack 1 through the management network 20. The so-called "configuration information" is relevant information that an IMM must know when managing and controlling internal rack devices in a corresponding rack system. Therefore, the configuration information includes a network protocol address of each of the IMMs, and a plurality of peripheral addresses (for example, a network protocol address of each internal rack device) and relevant configuration setting information of each of the internal rack devices.

Taking configuration information of the IMM 350_2 in Rack 2 as an example, the configuration information generated by the IMM 350_2 includes a network protocol address of the IMM 350_2 itself, a network protocol address of each of the internal rack devices (for example, the fan units 340_2, the power supply unit 330_2, and the BMCs of the servers 320_2 in Rack 2 in FIG. 3), and configuration setting information set by the IMM 350_2 for each internal rack device. In other words, the configuration setting information may be a fan rotation speed parameter set for each fan unit 340_2, a power supply parameter set for the power supply unit 330_2, a control parameter set for the BMC of each server 320_2 by the IMM 350_2, and so on.

After Step S240, the primary IMM 350_1 begins to monitor other IMMs (for example, the IMMs 350_2-350_4) than the primary IMM 350_1 in the corresponding rack group (for example, the rack group 305 in FIG. 3) to judge whether an anomaly occurs, or the primary IMM 350_1 judges whether the other IMMs 350_2-350_4 in the rack group 305 submit an entrustment request. The so-called "anomaly" herein may refer to the situation that a network link between the primary IMM 350_1 and the IMMs 350_2-350_4 cannot be connected, one of the management network switches 370_1-370_4 is failed and thus disconnected, one of the IMMs 350_2-350_4 is failed, or the like.

How the primary IMM 350_1 judges whether an anomaly occurs is described herein with an example. If the primary IMM 350_1 does not receive an acknowledgement response returned by one of the IMMs 350_2-350_4 occasionally, for example, the number of times that the primary IMM 350_1 does not receive an acknowledgement response of the IMM 350_2 (which may also be referred to as a specific IMM below) continuously is smaller than a threshold, it is possible that the IMM 350_2 at that time has been fully loaded, and the network link is too congested so that the acknowledgement response cannot be received for the moment. The situation is allowed to occur occasionally. However, if the number of times that the primary IMM 350_1 does not receive the acknowledgement response continuously is greater than the threshold, the primary IMM 350_1 has to judge that an anomaly has occurred in the IMM 350_2 not returning the acknowledgement response.

In similar embodiments, the primary IMM 350_1 may also judge whether an anomaly occurs by monitoring a communication connection status of the IMMs 350_2-350_4. In other words, since each of the IMMs 350_2-350_4 is communicatively connected to the servers 320_2-320_4 managed by the IMM periodically, the primary IMM 350_1 can judge whether an anomaly occurs in the IMMs 350_2-350_4 or in the network links from the primary IMM 350_1 to the IMMs 350_2-350_4 by monitoring the status of receiving/sending a network packet by the IMMs 350_2-350_4.

Therefore, in Step S250, the primary IMM 350_1 continuously judges whether an anomaly occurs in the other IMMs 350_2-350_4 in the rack group 305 or whether an IMM (herein referred to as a specific IMM) in the IMMs 350_2-350_4 submits an entrustment request. It is assumed herein that an anomaly occurs in the IMM 350_2 at this time, or the IMM 350_2 submits an entrustment request to the primary IMM 350_2 at this time.

Therefore, if the judgment result of Step S250 is YES, the process proceeds from Step S250 to Step S255, in which the primary IMM 350_1 manages, through the network according to the configuration information of Rack 2 backed up by the IMM 350_2 in the IMM 350_1, a plurality of internal rack devices located in the rack system 300_2 that are originally managed by the IMM 350_2. Thereby, the IMM 350_1 can manage the internal rack devices of Rack 1 and the internal rack devices of Rack 2 at the same time by performing the server management procedure, heat dissipation management procedure, and/or power management procedure. On the contrary, if the judgment result of Step S250 is NO, Step S240 and Step S250 are performed.

In other extended embodiments of the present invention, in Step S255, the primary IMM 350_1 not only can manage by itself the internal rack devices originally managed by the specific IMM 350_2, but also can designate another IMM located in the rack group 305 with light load to perform entrusted management on the internal rack devices in Rack 2 in place of the primary IMM 350_1, so as to reduce the computation load of the primary IMM 350_1. For example, upon detecting that an anomaly has occurred in the IMM 350_2 of Rack 2, the primary IMM 350_1 may judge an IMM (for example, the IMM 350_4) operating normally and having a low computation load in the rack group 305. Afterwards, the primary IMM 350_1 transfers the configuration information of Rack 2 originally backed up therein to the IMM 350_4, and designates the IMM 350_4 to perform entrusted management on the internal rack devices of Rack 2.

Referring back to FIG. 2 and FIG. 3, when the anomaly occurs in the specific IMM 350_2, the primary IMM continues to perform Step S260 to begin to detect a communication link between the primary IMM 350_1 and the abnormal IMM 350_2, whether the IMM 350_2 is really failed, and whether relevant devices in the rack system 300_2 corresponding to the IMM 350_2 can still be connected to the management network 20, so as to generate a detection result, and send a warning message including the abnormal IMM 350_2 and the detection result to a remote integrated management center on the management network 20. Thereby, management personnel maintaining the rack systems 300_1-300_M can immediately know the occurrence of the anomaly through the remote integrated management center, so as to remove the anomaly right away. The warning message may include an email message, a system log, and/or a Simple Network Management Protocol (SNMP) Trap message, and the type of the warning message is not limited in the embodiment of the present invention.

Then, in Step S262, the primary IMM 350_1 judges whether the IMM detected abnormal or submitting the entrustment request is the secondary IMM (for example, the IMM 350_3). If the judgment result of Step S262 is NO, the process returns to Step S240 to continue performing the synchronous configuration procedure. On the contrary, if the primary IMM 350_1 finds that the entrusted IMM is really the secondary IMM 350_3, the process proceeds from Step S262 to Step S265, in which the primary IMM 350_1 selects one of other IMMs operating normally in the rack group 305 to become the new secondary IMM. Thereby, when the secondary IMM 350_3 is abnormal, failed, or submits the entrustment request, the primary IMM 350_1 designates another IMM operating normally to become the new deputy leader, so as to continue to perform Steps S270-S297 in FIG. 2.

Still referring to FIG. 2 and FIG. 3, Steps S270-S297 are described with the secondary IMM 350_3. Since Steps S240-S250 performed by the primary IMM 350_1 are similar to Steps S270-S280 performed by the secondary IMM 350_3, some description can be seen in the above text, and will not be given herein again.

In Step S270, the secondary IMM 350_3 (deputy leader) also performs the synchronous configuration procedure on other IMMs 350_1, 350_2, and 350_4, so as to back up a plurality of pieces of configuration information of the IMMs 350_1, 350_2, and 350_4 in the rack group 305. Then, in Step S280, the secondary IMM 350_3 judges whether an anomaly occurs in the other IMMs 350_1, 350_2, and 350_4 in the rack group 305 or whether an IMM in the IMMs 350_1, 350_2, and 350_4 submits an entrustment request.

If the judgment result of Step S280 is NO, the process returns to Step S270 to continue performing the synchronous configuration procedure. If the secondary IMM 350_3 judges that an anomaly has occurred in one of the IMMs 350_1, 350_2, and 350_4 in the rack group 305 or the secondary IMM 350_3 receives, through the management network 20, an entrustment request sent by one of the IMMs 350_1, 350_2, and 350_4, the process proceeds from Step S280 to Step S285, in which the secondary IMM 350_3 judges whether the IMM that becomes abnormal or sends the entrustment request is the primary IMM 350_1.

If the judgment result of Step S285 is NO, the IMM that becomes abnormal or sends the entrustment request may be processed by the primary IMM 350_1, and the secondary IMM 350_3 returns to Step S270 to continue performing the synchronous configuration procedure, so as to serve as a redundant device of the primary IMM 350_1. However, if the judgment result of Step S285 is YES, the process proceeds from Step S285 to Step S290 to convert the secondary IMM 350_3 into the new primary IMM, and select one of other IMMs operating normally in the rack group 305 to become the new secondary IMM. Thereby, the new primary IMM 350_3 manages, through the network, the internal rack devices of Rack 1 that are originally managed by the abnormal IMM 350_1.

Then, in Step S297, the new primary IMM 350_3 detects the IMM 350_1 and the relevant internal devices of the rack system 300_1, for example, detects a communication link between the new primary IMM 350_3 and the abnormal IMM 350_1, whether the IMM 350_1 is really failed, whether the relevant devices in the rack system 300_1 corresponding to the IMM 350_1 can still be connected to the management network 20, and the like, so as to generate a detection result, and sends a warning message to the remote integrated management center according to the IMM 350_1 and the detection result.

To sum up, in the embodiment of the present invention, a leader (primary IMM) and a deputy leader (secondary IMM) are selected from a plurality of rack systems in each rack group, the leader and the deputy leader back up all IMMs in the rack group synchronously through a network, and when an anomaly occurs in a certain IMM or the IMM submits an entrustment request, the leader can use the backed up data to manage and control in time internal rack devices to be entrusted, and the deputy leader serves as a redundant device of the leader. Therefore, the management and control method provided in this embodiment has high reliability and enables entrusted management in a centralized way, thereby facilitating centralized management of servers without increasing additional hardware cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An entrusted management method for a plurality of rack systems, comprising:

providing the rack systems, wherein each rack system respectively comprises an integrated management module (IMM) and a plurality of internal rack devices, and the IMMs respectively manage the internal rack devices through a network;

distributing the rack systems into at least one rack group, and selecting one of the IMMs in each rack group to serve as a primary IMM;

wherein each tack moup comprises more than one of the rack systems:

the primary IMM being connected to other IMMs through the network, and performing a synchronous configuration procedure to back up a plurality of pieces of configuration information of the other IMMs in the rack group; and when an anomaly occurs in a specific IMM of the IMMs in the rack group or the specific IMM submits an entrustment request, the primary IMM managing, through the network, the internal rack devices originally managed by the specific IMM, wherein the primary IMM and the specific IMM are not in a same rack system;

wherein the step of judging whether other IMMs are abnormal comprises: the primary IMM periodically sending a plurality of acknowledgement signals to the specific IMM, and receiving a response signal transferred by the specific IMM, and when the number of times that the primary IMM does not receive the response signal transferred by the specific IMM is greater than a threshold, the primary IMM judging that the anomaly has occurred in the specific IMM.

2. The entrusted management method according to claim 1, wherein the configuration information comprises a network protocol address of each of the IMMs, and a plurality of peripheral addresses and a plurality of pieces of configuration setting information of each of the internal rack devices.

3. The entrusted management method according to claim 1, wherein the step of performing the synchronous configuration procedure comprises: the specific IMM backing up a piece of specific configuration information for managing a specific rack system to the primary IMM.

4. The entrusted management method according to claim 1, further comprising: selecting another of the IMMs in the rack group to serve as a secondary IMM; the secondary IMM performing the synchronous configuration procedure to back up the configuration information of the other IMMs in the rack group; when the anomaly occurs in the specific IMM or the specific IMM submits the entrustment request, the secondary IMM judging whether the specific IMM is the primary IMM; and when the specific IMM is the primary IMM, converting the secondary IMM into the primary IMM, and selecting one of the other IMMs operating normally in the rack group to become the new secondary IMM.

5. The entrusted management method according to claim 4, further comprising: when the anomaly occurs in the specific IMM, the secondary IMM detecting the specific IMM and a specific rack system corresponding to the specific IMM to generate a detection result, and sending a warning message comprising information of the specific IMM and the detection result.

6. The entrusted management method according to claim 5, wherein the secondary IMM detects a communication link between the secondary IMM and the abnormal IMM to generate the detection result.

7. The entrusted management method according to claim 1, further comprising: when the anomaly occurs in the specific IMM, the primary IMM detecting the specific IMM and a specific rack system corresponding to the specific IMM to generate a detection result, and sending a warning message comprising information of the specific IMM and the detection result.

8. The entrusted management method according to claim 7, wherein the primary IMM detects a communication link between the primary IMM and the abnormal IMM to generate the detection result.

9. The entrusted management method according to claim 1, wherein the step of judging whether other IMMs are abnormal comprises: the primary IMM monitoring a network connection status of the specific IMM to judge whether the anomaly occurs in the specific IMM.

10. The entrusted management method according to claim 1, wherein the internal rack devices are a plurality of baseboard management controllers (BMCs), a plurality of fan units, a plurality of power supplies, and/or a combination thereof disposed in the rack systems.

11. The entrusted management method according to claim 10, wherein the primary IMM performs a server management procedure, a heat dissipation management procedure, or a power management procedure to manage the primary internal rack devices and/or the entrusted specific internal rack devices.

12. The entrusted management method according to claim 1, wherein each rack system further comprises a switch, the IMM and the internal rack devices in the rack system are all connected to the switch, and the switches in the rack group are connected to each other to implement communication between the IMMs, and the primary IMM manages and controls, through a switch of the rack system corresponding to the primary IMM and a switch of a specific rack system corresponding to the specific IMM, the internal rack devices in the specific rack system.

13. The entrusted management method according to claim 1, wherein the step of distributing the rack systems into at least one rack group comprises: matching the corresponding IMMs automatically according to at least one feature value of the IMMs, so that the rack systems corresponding to the IMMs in the same network segment are classified into the same rack group.

14. The entrusted management method according to claim 13, wherein the at least one feature value is a name, a network protocol address, and/or a media access control (MAC) address of each of the IMMs.

* * * * *